United States Patent
Nakamura et al.

(10) Patent No.: US 9,304,228 B2
(45) Date of Patent: Apr. 5, 2016

(54) OBJECT DETECTION APPARATUS WITH DETECTION BASED ON REFLECTED LIGHT OR SCATTERED LIGHT VIA AN IMAGING UNIT

(71) Applicants: Tadashi Nakamura, Tokyo (JP); Shigeaki Imai, Kanagawa (JP); Shuichi Suzuki, Kanagawa (JP); Mitsuru Nakajima, Kanagawa (JP); Kenichi Yoshimura, Kanagawa (JP); Hiroyoshi Funato, Kanagawa (JP)

(72) Inventors: Tadashi Nakamura, Tokyo (JP); Shigeaki Imai, Kanagawa (JP); Shuichi Suzuki, Kanagawa (JP); Mitsuru Nakajima, Kanagawa (JP); Kenichi Yoshimura, Kanagawa (JP); Hiroyoshi Funato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 283 days.

(21) Appl. No.: 13/955,230

(22) Filed: Jul. 31, 2013

(65) Prior Publication Data

US 2014/0034817 A1    Feb. 6, 2014

(30) Foreign Application Priority Data

Aug. 6, 2012 (JP) .................. 2012-174181

(51) Int. Cl.
G02B 27/10 (2006.01)
G01V 8/22 (2006.01)
(Continued)

(52) U.S. Cl.
CPC ............... *G01V 8/22* (2013.01); *G01S 7/4817* (2013.01); *G02B 26/123* (2013.01)

(58) Field of Classification Search
CPC ............ G01V 8/22; G01V 8/20; G01V 8/12; G01C 3/00; G02B 26/105; G02B 26/12; G02B 5/09; G02B 26/129; G02B 26/125; G02B 27/28; G02B 26/0808; G02B 26/121; G02B 26/0816; G02B 26/124; G02B 26/123; G02B 21/002; G02B 26/10; G01S 7/024; G01S 7/4817; G01S 17/88; G01S 17/46; H04N 1/02815; H04N 1/1135; H04N 2201/0471; H04N 1/282; H04N 1/283; H04N 1/113; G01J 1/04; B41J 2/473; B23K 26/08; B23K 26/0807
USPC .............. 250/221, 578.1, 234–236; 356/3.09; 359/201.1, 201.2, 203.1, 204.1, 204.3, 359/212.1, 212.2, 216.1, 226.1, 226.2
See application file for complete search history.

(56) References Cited

U.S. PATENT DOCUMENTS 5,864,391 A    1/1999   Hosokawa et al.
6,317,202 B1 * 11/2001  Hosokawa et al. ........ 356/141.1
(Continued)

FOREIGN PATENT DOCUMENTS

JP    06-102343    4/1994
JP    3446466      7/2003
(Continued)

OTHER PUBLICATIONS

U.S. Appl. No. 13/909,340, filed Jun. 4, 2013.
(Continued)

*Primary Examiner* — Que T Le
(74) *Attorney, Agent, or Firm* — Oblon, McClelland, Maier & Neustadt, L.L.P

(57) ABSTRACT

An object detection apparatus includes an incident optical system, which includes light source units and a combining unit combining light beams emitted from the light source units; a deflection unit including rotating reflection parts that deflect the light beams to scan and be irradiated on a predetermined range of an object; an imaging unit forming an image based on the light from the predetermined range of the object; and an optical detection unit detecting the object based on the light received via the imaging unit. Further the combining unit combines the light beams such that each of the combined light beams passes a single light path when projected onto a predetermined plane, and each of the light paths exists outside a region of the deflection unit when projected onto the first plane.

8 Claims, 8 Drawing Sheets

(51) Int. Cl.
*G01S 7/481* (2006.01)
*G02B 26/12* (2006.01)

(56) References Cited

U.S. PATENT DOCUMENTS

| | | | |
|---|---|---|---|
| 2008/0068691 A1* | 3/2008 | Miyatake | 359/204 |
| 2013/0077083 A1 | 3/2013 | Suzuki et al. | |
| 2013/0120734 A1 | 5/2013 | Ogata et al. | |

FOREIGN PATENT DOCUMENTS

| | | |
|---|---|---|
| JP | 2009-103529 | 5/2009 |
| JP | 2011-179969 | 9/2011 |

OTHER PUBLICATIONS

U.S. Appl. No. 13/771,465, filed Feb. 20, 2013.
U.S. Appl. No. 13/930,030, filed Jun. 28, 2013.
U.S. Appl. No. 13/920,421, filed Jun. 18, 2013.

* cited by examiner

OBJECT DETECTION APPARATUS WITH DETECTION BASED ON REFLECTED LIGHT OR SCATTERED LIGHT VIA AN IMAGING UNIT

CROSS-REFERENCE TO RELATED APPLICATIONS

The present application is based on claims the benefit of priority under 35 U.S.C. §119 of Japanese Patent Application No. 2012-174181 filed Aug. 6, 2012, the entire contents of which are hereby incorporated herein by reference.

BACKGROUND OF THE INVENTION

1. Field of the Invention

The present invention relates to an object detection apparatus.

2. Description of the Related Art

Recently, there has been known an object detection apparatus that may detect the existence of an object and the distance to the object.

As an example of such an object detection apparatus, there is an apparatus that irradiates light to an object to measure the distance from the apparatus to the object by irradiating light, reflecting the irradiated light by a surface of a rotating polygon mirror (rotation mirror), focusing the reflected light with a focusing lens to irradiate the focused light onto the object, and reflecting the returned light from the object by another surface of the polygon mirror to focus the reflected light onto a receiving device of the apparatus (see, for example, Japanese Laid-open Patent Publication No. H06-102343).

Further, as another example of the object detection apparatus, there is an apparatus that may scan light in a desired area by alternately turning on a plurality of light sources arranged in the scanning direction without using (having) a deflection unit (means) such as the rotation mirror (see, for example, Japanese Laid-open Patent Publication No. 2009-103529).

SUMMARY OF THE INVENTION

According to an aspect of the present invention, an object detection apparatus includes an incident optical system, which includes a plurality of light source units, and a combining unit configured to combine light beams emitted from the light source units; a deflection unit including rotating reflection parts that deflect the light beams to scan and be irradiated on a predetermined range of an object; an imaging unit forming an image based on reflected light or scattered light from the predetermined range of the object; and an optical detection unit configured to detect the object based on the reflected light or the scattered light received via the imaging unit. Further, the combining unit is configured to combine the light beams emitted from the light source units such that each of the combined light beams travels a single light path when the combined light beams are projected onto a first plane and each of the light paths exists outside a region of the deflection unit when the light paths are projected onto the first plane.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

Figure 1A:
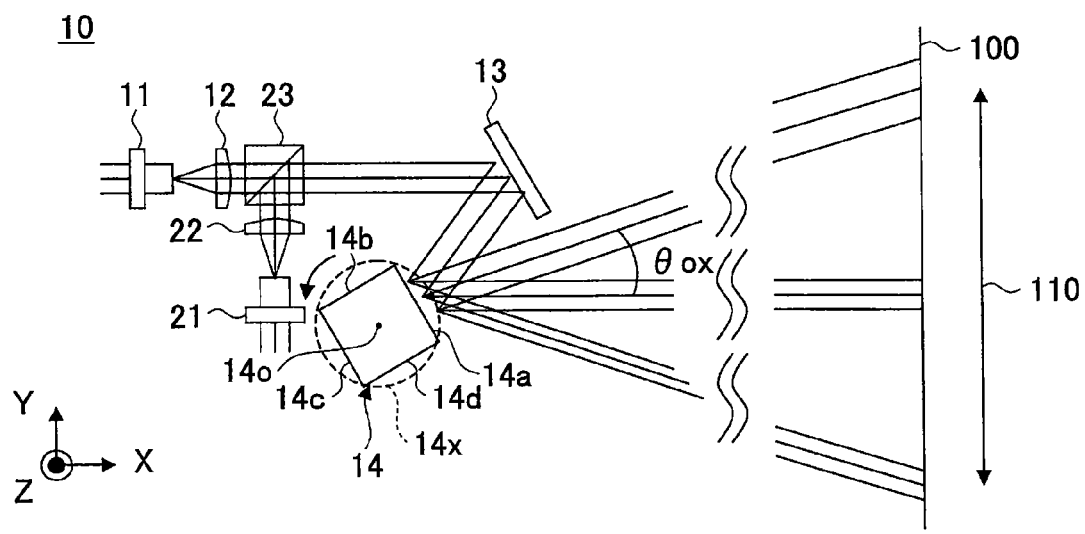
FIGS. 1A and 1B schematically illustrate an example projection-side optical system of an object detection apparatus according to a first embodiment.

In an object detection apparatus such as that disclosed in Japanese Laid-open Patent Publication No. H06-102343, the light from a single light source is incident onto the rotation mirror. Therefore, it may be difficult to detect an object from a two-dimensional region and an object disposed far from the apparatus by increasing the light amount of the apparatus as well.

Further, in an object detection apparatus such as that disclosed in Japanese Laid-open Patent Publication No. 2009-103529, a plurality of light sources are used but no deflection unit is used. Due to this configuration, it may still be difficult to sufficiently detect an object from a two-dimensional region and an object disposed far from the apparatus by increasing the light amount of the apparatus as well.

Further even if the above two disclosed configurations of Japanese Laid-open Patent Publication Nos. H06-102343 and 2009-103529 (i.e., the deflection unit such as a rotation mirror and the plurality of light sources) are simply combined, truncation of the light beam in the incident optical system may occur and, accordingly, the light amount may be reduced. As a result, it may still be difficult to detect an object from a two dimensional region and an object far from the apparatus.

A present invention is made to solve at least one of the problems and may provide an object detection apparatus that has a deflection unit and a plurality of light sources and may prevent the reduction of the light amount due to the occurrence of truncation of a light beam.

In the following, embodiments of the present invention are described with reference the accompanying drawings. Further, the same reference numerals are repeatedly used in the figures, and repeated descriptions may be omitted.

First Embodiment

Figure 1B:
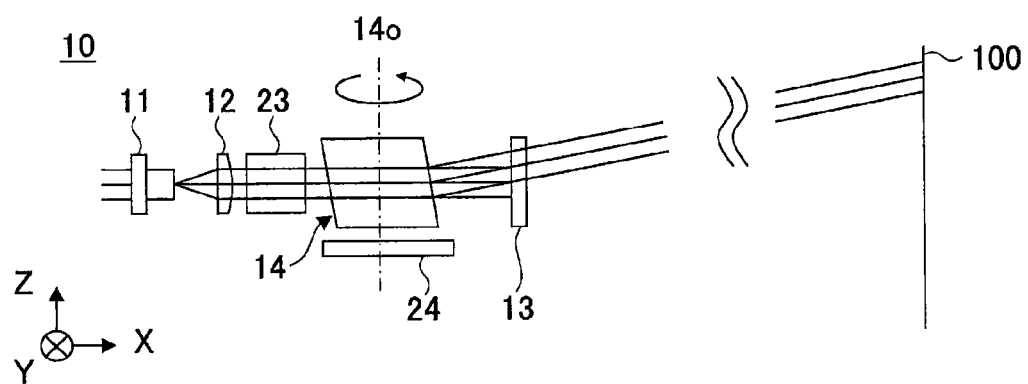

FIGS. 1A and 1B schematically illustrate an example projection-side optical system of an object detection apparatus according to a first embodiment. Specifically, FIG. 1A illustrates a cross section in the direction parallel to the XY plane, and FIG. 1B illustrates a cross section in the direction parallel to the XZ plane.

Figure 2A:
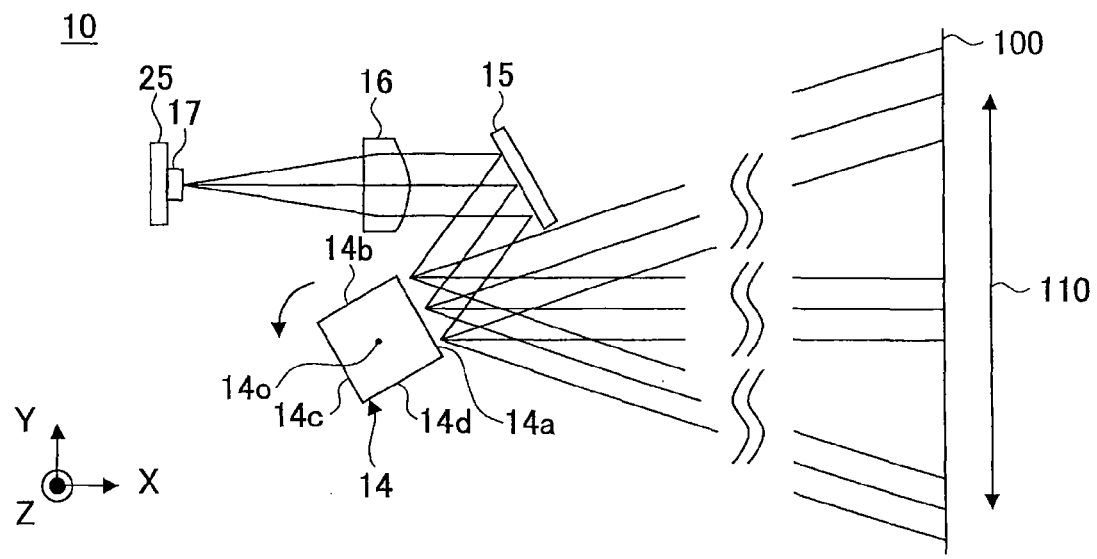
FIGS. 2A and 2B schematically illustrate an example light-receiving-side optical system of the object detection apparatus according to the first embodiment.
Figure 2B:
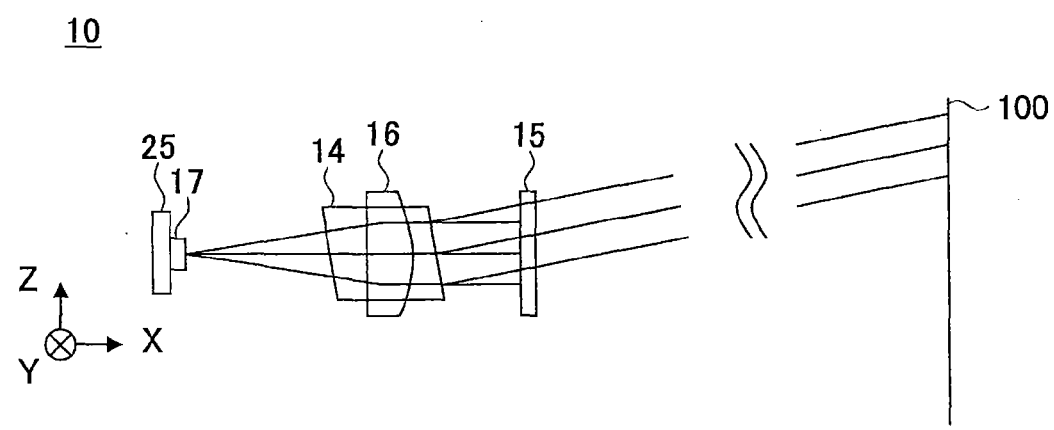

Further, FIGS. 2A and 2B schematically illustrate an example light-receiving-side optical system of the object detection apparatus according to the first embodiment. Specifically, FIG. 2A illustrates a cross section in the direction parallel to the XY plane, and FIG. 2B illustrates a cross section in the direction parallel to the XZ plane.

In the description, the term "parallel" refers to not only strictly (accurately) parallel but also substantially parallel as long as a desired effect of the present invention is achieved. Further, the term "perpendicular" refers to not only strictly (accurately) perpendicular but also substantially perpendicular as long as the desired effect of the present invention is achieved.

As shown in FIGS. 1A through 2B, an object detection apparatus 10 generally includes light sources 11 and 21, coupling lenses 12 and 22, a reflection mirror 13, a rotation mirror 14, a reflection mirror 15, an imaging lens 16, an optical detector 17, a combining unit 23, and an optical detector driving board 25. Further, reference numerals 100 and 110 denote an image surface of the object to be detected and the detection range, respectively.

Further, in FIGS. 1A through 2B, the three-dimensional orthogonal coordinate axes (i.e., X axis, Y axis, and Z axis) are provided. The X axis extends in the direction from the rotation mirror 14 to the center of the detection range 110. The Y axis extends in the scanning direction generated by the rotation mirror 14. The Z axis extends in the direction parallel to the rotation axis of the rotation mirror 14. The three-dimensional orthogonal coordinate axes are also applied to the rest of the drawings.

The light sources 11 and 21 are arranged at the same position in the Z axis direction when viewed from the direction perpendicular to the XZ plane. In the following, as the light sources 11 and 21, solid light sources such as semiconductor lasers and light emitting diodes may be used. In this embodiment, a case is described where the semiconductor lasers are used as the light sources 11 and 21 to output pulsed light.

The coupling lenses 12 and 22 are disposed on the downstream sides of the light sources 11 and 21, respectively. Further, the coupling lenses 12 and 22 are disposed at the same position in the Z-axis direction when viewed from the direction perpendicular to the XZ plane. Further, each of the coupling lenses 12 and 22 may include a plurality of optical devices. The coupling lenses 12 and 22 render the light beam emitted from the light sources 11 and 21, respectively, into a predetermined state (in which, for example, the light beam is focused (collected)).

Herein, the term "light beam" refers to a bundle of light rays emitted in various directions from a light source. Therefore, the term "light ray" herein refers to light included in the light beam and traveling in a particular direction.

In this embodiment, the coupling lenses 12 and 22 are disposed (arranged) so that the light beams emitted from the light sources 11 and 21, respectively, are substantially parallel to each other. But, actually, due to an influence of the light emitting widths of the light emitting sections of the light sources 11 and 21 (semiconductor lasers), the light having passed through the coupling lenses 12 and 22, respectively, is diverging light.

Further, a combination of the light source 11 and the coupling lens 12 is a representative (typical) example of a light source unit according an embodiment. Also, a combination of the light source 21 and the coupling lens 22 is a representative example of the light source unit according an embodiment. Further, the coupling lenses 12 and 22 are a representative example of an optical device.

The light beams emitted from the light source 11 and having passed through the coupling lens 12 are combined with the corresponding light beams emitted from the light source 21 and having passed through the coupling lens 22 in the combining unit 23.

Herein, an optical system of the light from the light sources 11 and 21 to the rotation mirror 14 via the coupling lenses 12 and 22, respectively, and the combining unit 23 may be called an incident optical system.

In this embodiment, the combining unit 23 combines the light beams emitted from the light source 11 (and having passed through the coupling lens 12) with the corresponding light beams emitted from the light source 21 (and having passed through the coupling lens 22) so that the combined light beams pass (travel) in the same respective optical paths when projected onto the XY plane.

Namely, when viewed from the direction perpendicular to the XY plane, the light beams combined by the combining unit 23 can be seen as an overlapped single light beam. Further, the XY plane is a representative example of a "predetermined plane" in an embodiment.

Further, in this embodiment, the combining unit 23 combines the light beams emitted from the light source 11 (and having passed through the coupling lens 12) with the corresponding light beams emitted from the light source 21 and having passed through the coupling lens 22 so that the combined light beams pass (travel) in the same respective optical paths when projected onto the XZ plane.

Namely, when viewed from the direction perpendicular to the XZ plane, the light beam combined by the combining unit 23 can be seen as an overlapped single light beam.

The light beams combined by the combining unit 23 are incident on the reflection mirror 13, so that the light paths of the light beams are changed by the reflection mirror 13 to be incident on the rotation mirror 14. The angular difference between the direction of the light incident on the reflection mirror 13 and the direction of the light reflected by the reflection mirror 13 in the XY plane may be set to, for example, approximately 60 degrees.

The rotation mirror 14 includes at least two reflecting parts (reflecting surfaces), and the reflecting parts are tilted at different angles relative to the rotation axis 14o of the rotation mirror 14.

Further, in this embodiment, the optical paths in the incident optical system are designed so that the optical paths are outside the region 14x of the rotation mirror 14 when projected onto the XY plane. Here, the region 14x is defined as the outermost edge of the track of the rotation mirror 14 when the rotation mirror 14 is rotated.

The rotation mirror 14 (polariscope) is driven and controlled by a rotation mirror driving board 24 (polariscope driving unit). A combination of the rotation mirror 14 and the rotation mirror driving board 24 is a representative example of a deflection unit according to an embodiment.

Further, the incident optical system may be an optical system in which the light beams emitted from the light sources 11 and 21 are directly incident on the combining unit 23, and the combined light beams are incident on the reflection mirror 13 via one coupling lens. In this case, when the distance between the light source 11 and the single coupling lens is equal to the distance between the light source 21 and the single coupling lens, the convergence states in the single coupling lens become equivalent, which is preferable.

As the combining unit 23, a polarization beam splitter, a dichroic mirror or the like may be used. When the dichroic mirror is used as the combining unit 23, it may be desired that the oscillation wavelength of the light source 11 differs from the oscillation wavelength of the light source 21. In this case, when a temperature fluctuation range of the using use environment of the object detection apparatus 10 is wide, the wavelength transition of the light sources 11 and 21 due to the temperature fluctuation may become greater.

Therefore, it may become necessary to consider the greater wavelength transition due to the temperature fluctuation. Accordingly, it may be necessary to maintain a higher transmission factor and reflection ratio across a wide wavelength range. As a result, it may become difficult to secure sufficient reliability.

On the other hand, when a polarization beam splitter is used as the combining unit 23, it is not required that the emission wavelength of the light source 11 is (set to be) different from the emission wavelength of the light source 21. Therefore, it becomes possible to stably combine a plurality of light beams regardless of the wavelength transition of the light sources.

However, in the case where the polarization beam splitter is used as the combining unit 23, it may be necessary to have the polarization states of the light beams incident on the polarization beam splitter be different from each other.

In general, the polarization direction is determined based on the direction of the active layer ("active-layer direction") of the laser diode. Therefore, to achieve the different polarization states, it is thought necessary that the active-layer direction of one light source is different from the active layer-direction of the other light source (by, for example, rotating relative to the emission direction of the light beam by 90 degrees).

However, in this case, if the profile in the first direction relative to the light emission direction of the light beam differs from the profile in the second direction orthogonal to the first direction relative to the light emission direction of the light beam, the same region to be detected by the light beams and the same angular resolution may not be achieved.

To resolve the problem, in this embodiment, by disposing a unit such as a half-wavelength plate that changes the polarization direction (polarization direction changing unit) on the optical path (light path) between one light source and the polarization beam splitter, it becomes possible to change the polarization direction only without changing the profile.

By doing this, it may become possible to combine light beams while the active-layer direction of the light sources 11 and 21 is maintained in the same direction (i.e., while the profiles of the light beams from the light sources in the irradiated region are equal to each other). As a result, it may become possible for the same region to be detected by the light beams with the same angular resolution.

Further, when a plurality of the light beams have different polarization states, the transmission factors and the reflection ratios of the light beams in the optical devices used in the object detection apparatus 10 may differ from each other. Further, the reflection/diffusion states at the object may also differ from each other.

To resolve the problem, in this embodiment, by disposing a polarization state changing unit that changes the polarization states of the light beams (e.g., a quarter-wavelength plate that changes the polarization state from linear polarization in different polarization directions to circular polarization) on the downstream side of the polarization beam splitter, the polarization states may be changed to the same polarization state. As a result, it may become possible to stabilize the light amounts of the light beams and achieve the same detection accuracy among the light beams.

In this embodiment, the rotation mirror 14 includes four reflection parts 14a, 14b, 14c, and 14d. The slant angles of the reflection parts 14a, 14b, 14c, and 14d relative to the rotation axis 14o are set to be different from each other.

By having the reflection parts 14a, 14b, 14c, and 14d, it becomes possible to switch the traveling direction of the light beam reflected by the rotation mirror 14 relative to the XY plane. Therefore, the layer to be detected may be shifted in the Z direction for each of the reflection parts 14a, 14b, 14c, and 14d.

Namely, the regions different from each other in the Z direction may be scanned by separately using the reflection parts 14a, 14b, 14c, and 14d. In the case according to this embodiment, four layers may be detected.

The light beam incident on the rotation mirror 14 is deflected by the rotating reflection parts 14a, 14b, 14c, and 14d, so that the irradiated light beam scans the detection range 110 of the image surface 100.

The reflected light and the scattered light from the detection range 110 of the image surface 100 are incident on the rotation mirror 14 again, sequentially reflected by the reflection parts 14a, 14b, 14c, and 14d, and further reflected by the reflection mirror 15 to be incident on the imaging lens 16.

The imaging lens 16 forms an image based on the reflected light or the scattered light from the detection range 110 of the image surface 100. The reflected light or the scattered light from the detection range 110 of the image surface 100 that passes through the imaging lens 16 is incident on the optical detector 17. The imaging lens 16 is a representative example of an imaging unit according to an embodiment.

The optical detector 17 includes a light receiving surface to receive the reflected light or the scattered light via the imaging lens 16 to detect an object, the reflected light or the scattered light being based on the light beam irradiated on the detection range 110 of the image surface 100. As the optical detector 17, an Avalanche Photodiode (APD), a PIN photodiode (PPD) or the like may be used.

The optical detector 17 is driven and controlled by the optical detector driving board 25 (optical detector driving unit). A combination of the optical detector 17 and the optical detector driving board 25 is a representative example of an optical detection unit according to an embodiment. Further, the light-receiving-side optical system may include only a lens and an optical detector without any rotation mirror.

Next, an effect particular to the object detection apparatus 10 in this embodiment is described with reference to cases of comparative examples where no combining unit is used.

Figure 3A:
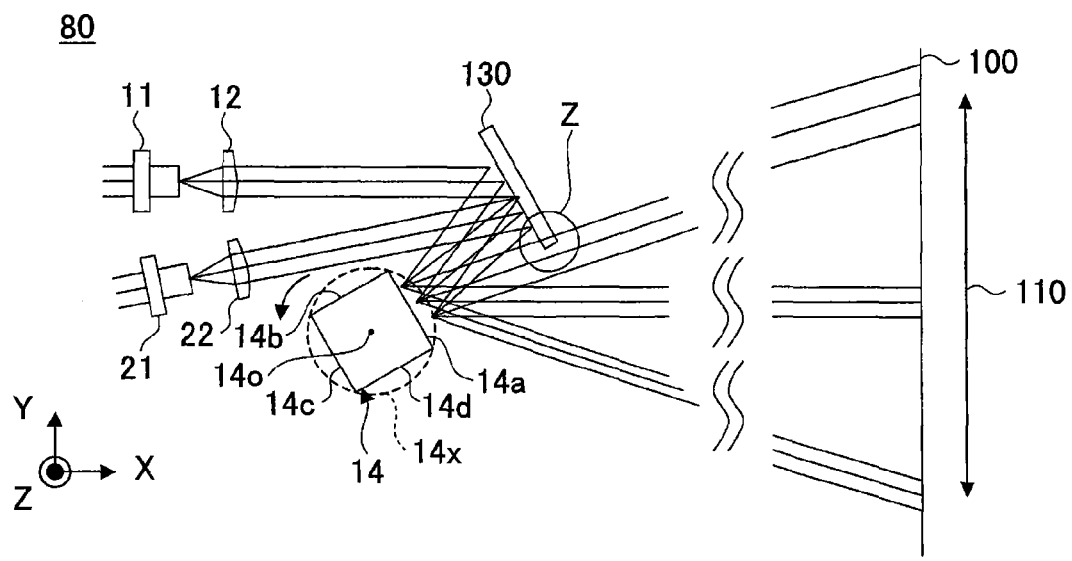
FIGS. 3A and 3B schematically illustrate comparative examples of projection-side optical systems of the object detection apparatus.
Figure 3B:
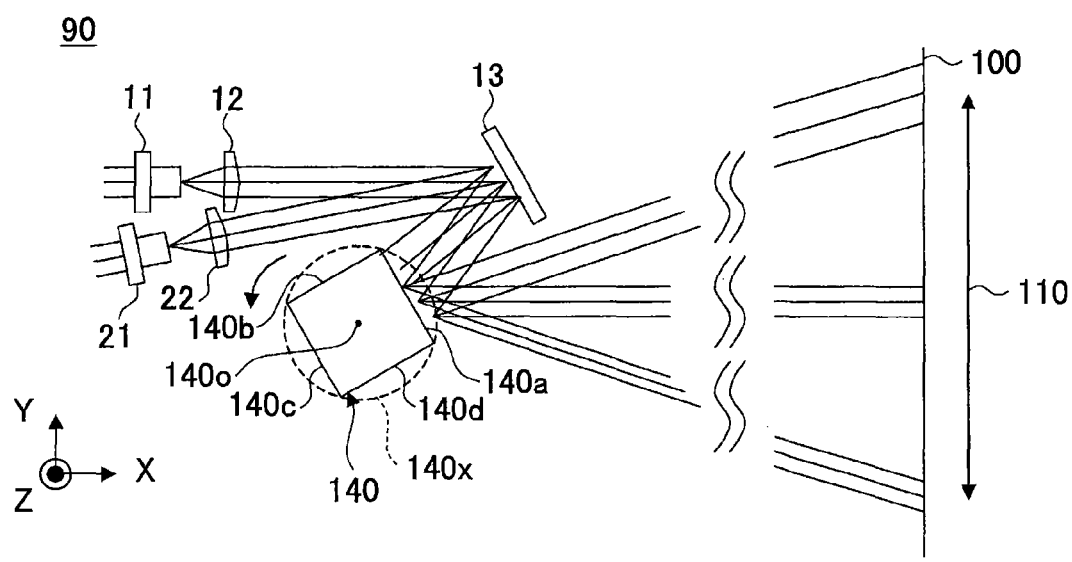

FIGS. 3A and 3B schematically illustrate projection-side optical systems of object detection apparatuses in the cross section parallel to the XY plane according to the comparative examples.

FIG. 3A illustrates an object detection apparatus 80 according to one of the comparative examples. As shown in FIG. 3A, in the object detection apparatus 80, the light sources 11 and 21 and the coupling lenses 12 and 22 are arranged so that the there is an angular difference between the direction of the optical beams from the light source 11 and the coupling lens 12 and the direction of the optical beams from the light source 21 and the coupling lens 22.

Namely, the direction of the optical beams from the light source 11 and the coupling lens 12 is not parallel to the direction of the optical beams from the light source 21 and the coupling lens 22.

In this configuration, to avoid the increase in size of the rotation mirror 14 (i.e., to use the rotation mirror 14 having substantially the same size as that of the object detection apparatus), it may be required to cross the light beams, which are emitted from the light sources 11 and 21, on the rotation mirror 14 in the XY plane.

However, in this case, due to the different incident positions between light beams on the reflection mirror 13, it may become necessary to use a reflection mirror 130 having a greater size than that of the reflection mirror 13. As a result, the size of the object detection apparatus may be accordingly increased.

Further, when the reflection mirror 130 having a greater size is used, a part of the light beams reflected by the rotation mirror 14 may be blocked by a part Z (see FIG. 3A) of the reflection mirror 130. Namely, a so-called truncation may occur due to the part Z of the reflection mirror 130.

To avoid the occurrence of the truncation, it may be required to reduce the size of the light-beam radius or narrow the scanning angle. However, in any case, the light amount may be reduced and the detection range may also become smaller.

Further, in the case of FIG. 3A, the arrangements of the light sources 11 and 21 and the coupling lenses 12 and 22 may be changed so that the direction of the optical beams from the light source 11 and the coupling lens 12 is parallel to the direction of the optical beams from the light source 21 and the coupling lens 22. However, in this case, the exterior size of the object detection apparatus and the sizes of the reflection mirror and the rotation mirror may be similarly increased.

FIG. 3B illustrate an object detection apparatus 90 according to another comparative example. As shown in FIG. 3B, in the object detection apparatus 90, similar to the object detection apparatus 80 in FIG. 3A, the light sources 11 and 21 and the coupling lenses 12 and 22 are arranged so that the there is an angular difference between the direction of the optical beams from the light source 11 and the coupling lens 12 and the direction of the optical beams from the light source 21 and the coupling lens 22.

Namely, the direction of the optical beams from the light source 11 and the coupling lens 12 is not parallel to the direction of the optical beams from the light source 21 and the coupling lens 22.

In such arrangements, to avoid the increase of the size of the reflection mirror 13 (i.e., to use the reflection mirror 13 having substantially the same size as that of the object detection apparatus), it may be required to cross the light beams, which are emitted from the light sources 11 and 21, on the reflection mirror 13 in the XY plane.

However, in this case, due to the different incident positions between light beams on the rotation mirror 14, it may become necessary to use a rotation mirror 140 having a greater size than that of the rotation mirror 14 (having a region 140x greater than the region 14x). As a result, the size of the object detection apparatus may be accordingly increased.

Further, in FIG. 3B, the reference numeral 140o denotes the rotation axis of the rotation mirror 140, and the reference numerals 140a, 140b, 140c, and 140d denote the respective reflection parts (reflection surfaces) of the rotation mirror 140.

To avoid the use of the rotation mirror 140 having a greater size, it may be required to reduce the size of the light-beam radius or narrow the scanning angle. However, in any case, the light amount may be reduced and the detection range may also become smaller.

Further, in this configuration, due to closer distances between the light sources 11 and 21 and between the coupling lenses 12 and 22, the truncation may occur.

On the other hand, in the object detection apparatus 10 according to this embodiment, the combining unit 23 is used so that the light beams emitted from the light sources 11 and 21, which are semiconductor lasers, travel on the same optical path in the XY plane. Further, when the optical path in the incident optical system projected on the XY plane, it is designed that the optical path travels outside the region 14X of the rotation mirror 14. As a result, any optical path of the light beams in the incident optical system is not blocked (i.e., no truncation occurs) and it is not necessary to reduce the size of the light-beam radius.

Namely, unlike the cases of the comparative example, in this embodiment, it may become possible to detect an object using sufficient light beams without reducing the light amount and detection range or without increasing the entire size of the object detection apparatus.

Further, a plurality of light beams may irradiate the same regions of the object; therefore, a sufficient light amount may be applied to the object and an object further separated from the object detection apparatus may be detected more easily. The object detection apparatus 10 according to this embodiment may be used, for example, in a laser radar to be mounted in a vehicle.

Second Embodiment

In a second embodiment, an object detection apparatus, in which the arrangement of the optical devices in the projection-side optical system is different from that in the first embodiment, is described. In the description in the second embodiment, the same reference numerals are used to describe the same elements as described in the first embodiment and repeated descriptions thereof may be omitted.

Figure 4:
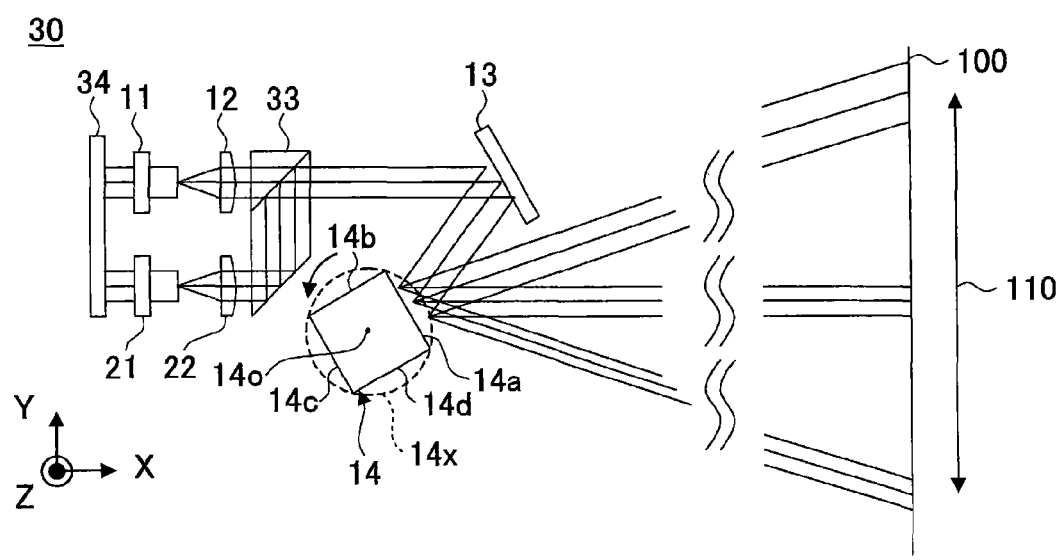
FIG. 4 schematically illustrates an example projection-side optical system of an object detection apparatus according to a second embodiment.

FIG. 4 schematically illustrates an example configuration of the projection-side optical system of an object detection apparatus according to the second embodiment in a cross section parallel to the XY plane. However, it should be noted that only the incident optical system to cause the light beams to be incident on the rotation mirror 14 is illustrated. Further, it is assumed that the configuration of the rest of the optical system, which is not illustrated in FIG. 4 (including the light-receiving-side optical system), is similar to the configuration in the first embodiment.

As illustrated in FIG. 4, in an object detection apparatus 30 according to the second embodiment, a combining unit 33 combines the light beams emitted from the light source 11 (and having passed through the coupling lens 12) with the corresponding light beams emitted from the light source 21 (and having passed through the coupling lens 22) so that the combined light beams pass (travel) in the same respective optical paths when projected onto the XY plane.

Namely, when viewed from the direction perpendicular to the XY plane, the light beam combined by the combining unit 33 can be seen as an overlapped single light beam.

Further, the combining unit 33 combines the light beams emitted from the light source 11 (and having passed through the coupling lens 12) with the corresponding light beams emitted from the light source 21 (and having passed through the coupling lens 22) so that the combined light beams pass (travel) in the same respective optical paths when projected onto the XZ plane. Namely, when viewed from the direction perpendicular to the XZ plane, the light beam combined by the combining unit 33 can be seen as an overlapped single light beam.

Further, in the incident optical system, the optical paths projected onto the XY plane are arranged so as to pass (travel) outside the region 14x of the rotation mirror 14.

However, the configuration of the object detection apparatus 30 according to the second embodiment differs from the configuration of the object detection apparatus 10 according to the first embodiment (see FIGS. 1A and 1B) in that the light sources 11 and 21 are arranged so that both of the emission axes (which extend in the direction parallel to the emitting direction of the light beams emitted from the respective light sources) of the light sources 11 and 21 are perpendicular to the light receiving surface of the optical detector 17 in the light-receiving-side optical system.

Further, the light beams emitted from the light sources 11 and 21 and having passed through the coupling lens 12 and 22, respectively, are incident on the combining unit 33.

By arranging the light sources 11 and 21 as illustrated in FIG. 4, it may become possible to integrate a driving circuit (light source driving unit) to drive and control the light sources 11 and 21 and a driving circuit (optical detector driving unit) to drive and control the optical detector 17 into the same substrate 34.

Therefore, the number of parts to be mounted may be reduced. Further, the distance between the light sources 11 and 21 the optical detector 17 may be reduced. Therefore, the size of the object detection apparatus may further be reduced.

Third Embodiment

In a third embodiment, an object detection apparatus, in which the arrangement of the optical devices in the projection-side optical system is different from that in the first and second embodiments, is described. In the description in the third embodiment, the same reference numerals are used to describe the same elements described in the above embodiments and repeated descriptions thereof may be omitted.

Figure 5A:
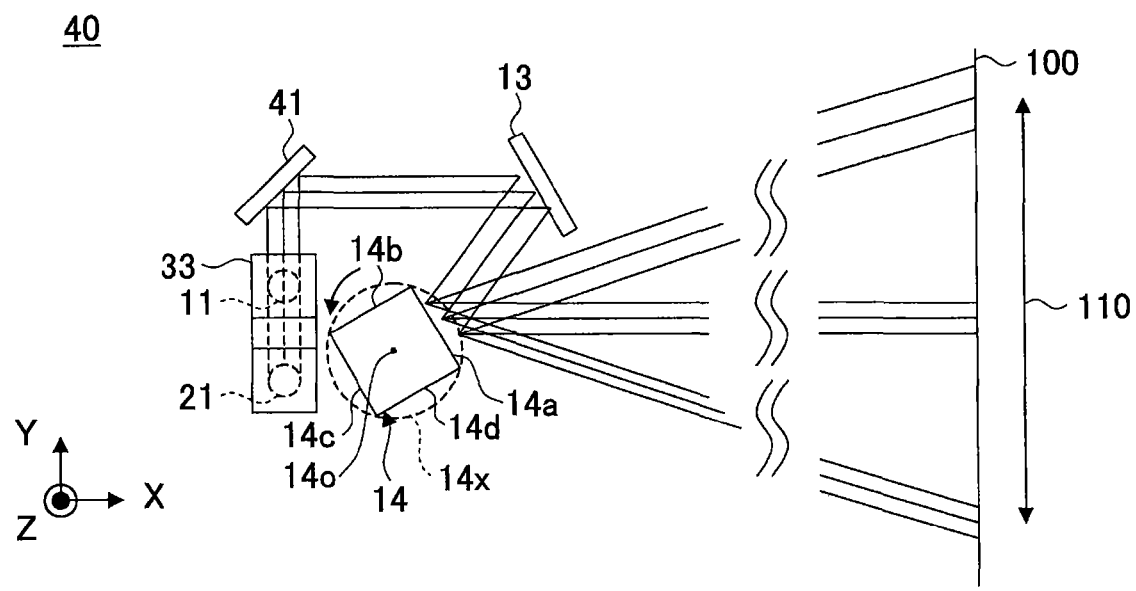
FIGS. 5A and 5B schematically illustrate an example projection-side optical system of an object detection apparatus according to a third embodiment.
Figure 5B:
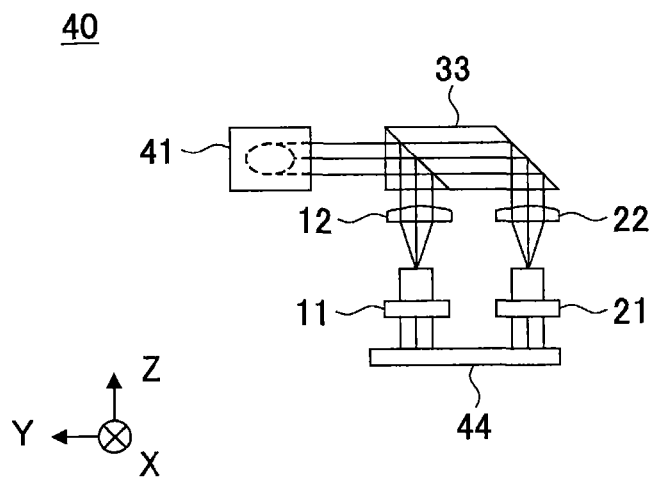

FIGS. 5A and 5B schematically illustrate an example projection-side optical system of an object detection apparatus according to the third embodiment. Specifically, FIG. 5A illustrates a cross section in the direction parallel to the XY plane, and FIG. 5B illustrates a cross section in the direction parallel to the YZ plane.

Further, it is assumed that the configuration of the rest of the optical system, which is not illustrated in FIGS. 5A and 5B (including the light-receiving-side optical system), is similar to the configuration in the first embodiment.

As schematically illustrated in FIGS. 5A and 5B, in an object detection apparatus 40 according to the third embodiment, the combining unit 33 combines the light beams emitted from the light source 11 with the corresponding light beams emitted from the light source 21 so that the combined light beams pass (travel) in the same respective optical paths when projected onto the XY plane.

Namely, when viewed from the direction perpendicular to the XY plane, the light beam combined by the combining unit 33 can be seen as an overlapped single light beam.

Further, the combining unit 33 combines the light beams emitted from the light source 11 with the corresponding light beams emitted from the light source 21 so that the combined light beams pass (travel) in the same respective optical paths when projected onto the XZ plane. Namely, when viewed from the direction perpendicular to the XZ plane, the light beam combined by the combining unit 33 can be seen as an overlapped single light beam.

Further, in the incident optical system, the optical paths projected onto the XY plane are arranged so as to pass (travel) outside the region 14x of the rotation mirror 14.

However, the configuration of the object detection apparatus 40 according to the third embodiment differs from the configuration of the object detection apparatus 10 according to the first embodiment (see FIGS. 1A and 1B) in that the light sources 11 and 21 are arranged so that both of the emission axes (which extend in the direction parallel to the emitting direction of the light beams emitted from the respective light sources) of the light sources 11 and 21 are perpendicular to the rotation axis 14o of the rotation mirror 14.

Further, the light beams emitted from the light sources 11 and 21 and having passed through the coupling lens 12 and 22, respectively, and the combining unit 33 are incident on a reflection mirror 41, and the light beams reflected by the reflection mirror 41 are incident on the reflection mirror 13.

By arranging the light sources 11 and 21 as illustrated in FIGS. 5A and 5B, it may become possible to integrate the driving circuit (light source driving unit) to drive and control the light sources 11 and 21 and a driving circuit (deflector driving unit) to drive and control the rotation mirror 14 into the same substrate 44.

Therefore, the number of parts to be mounted may be reduced. Further, the distance between the light sources 11 and 21 and the rotation mirror 14 may be reduced. Therefore, the size of the object detection apparatus may further be reduced.

Fourth Embodiment

In a fourth embodiment, an object detection apparatus, in which the arrangement of the optical devices in the projection-side optical system is different from that in the first, second, and third embodiments, is described. In the description in the fourth embodiment, the same reference numerals are used to describe the same elements described in the above embodiments and repeated descriptions thereof may be omitted.

Figure 6A:
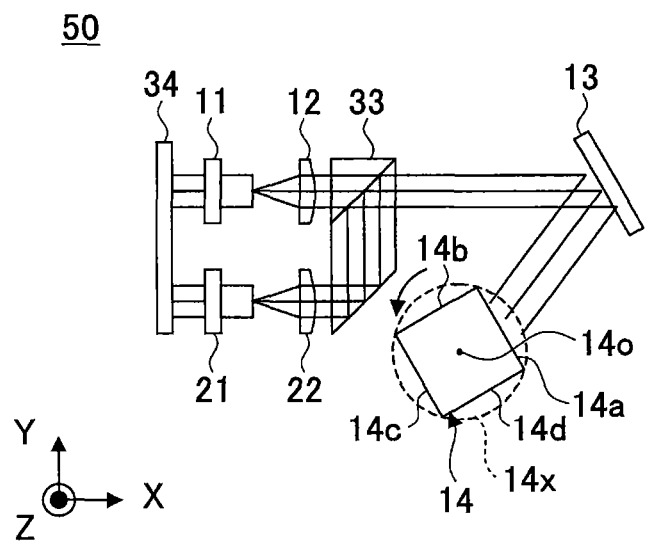
FIGS. 6A and 6B schematically illustrate an example projection-side optical system of an object detection apparatus according to a fourth embodiment.
Figure 6B:
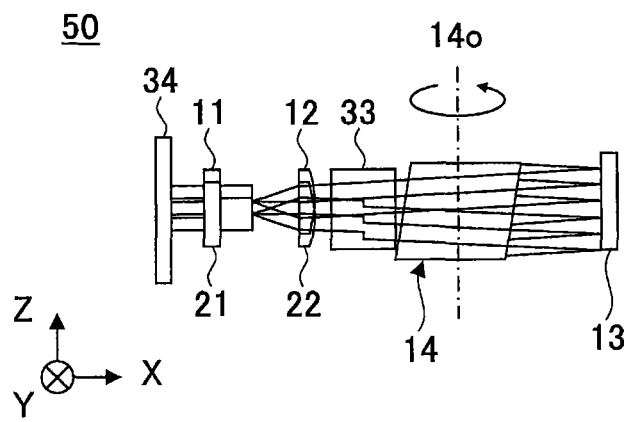

FIGS. 6A and 6B schematically illustrate an example projection-side optical system of an object detection apparatus according to the fourth embodiment. Specifically, FIG. 6A illustrates a cross section in the direction parallel to the XY plane, and FIG. 6B illustrates a cross section in the direction parallel to the XZ plane.

However, FIGS. 6A and 6B illustrate only the incident optical system until the light beam is incident on the rotation mirror 14. Further, it is assumed that the configuration of the rest of the optical system, which is not illustrated in FIGS. 6A and 6B (including the light-receiving-side optical system), is similar to the configuration in the first embodiment.

As schematically illustrated in FIGS. 6A and 6B, in an object detection apparatus 50 according to the fourth embodiment, the combining unit 33 combines the light beams emitted from the light source 11 with the corresponding light beams emitted from the light source 21 so that the combined light beams pass (travel) in the same respective optical paths when projected onto the XY plane.

Namely, when viewed from the direction perpendicular to the XY plane, the light beam combined by the combining unit 33 can be seen as an overlapped single light beam.

Further, in the incident optical system, the optical paths projected onto the XY plane are arranged so as to pass (travel) outside the region 14x of the rotation mirror 14.

However, the configuration of the object detection apparatus 50 according to the fourth embodiment differs from the configuration of the object detection apparatus 10 according to the first embodiment (FIGS. 1A and 1B) in that the combining unit 33 combines the light beams emitted from the light source 11 with the corresponding light beams emitted from the light source 21 so that each of the combined light beams travels in a different optical path when projected on the XZ plane.

Namely, when viewed from the direction perpendicular to the XZ plane, the combined beam cannot be seen as an overlapped single beam.

In other words, when projected onto the XZ plane, the light source 11 and the light source 21 are disposed (arranged) in different positions in the Z direction. Also, the coupling lens 12 and the coupling lens 22 are disposed in different positions in the Z direction. There is an angular difference between the light source 11 and the light source 21 in the XZ plane.

Therefore, the incident angle of the light beams emitted from the light source 11 on the rotation mirror 14 is different from the incident angle of the light beams emitted from the light source 21 on the rotation mirror 14. Further, in this embodiment, the XY plane is perpendicular to the plane including the light beams just before being incident on the rotation mirror 14.

By having this configuration, the light sources 11 and 21 can scan different regions in the Z direction of the detection range 110. Therefore, it may become possible to divide the detection range 110 into two layers to detect an object in the detection range 110.

Namely the detection resolution in the Z direction may be enhanced. By selecting (setting) the positions of the light sources and coupling lenses in the z direction, it may become possible to arbitrarily design (determine) the angle resolution and the overlapping manner in the region irradiated by the light beams from the light sources 11 and 21.

Figure 7A:
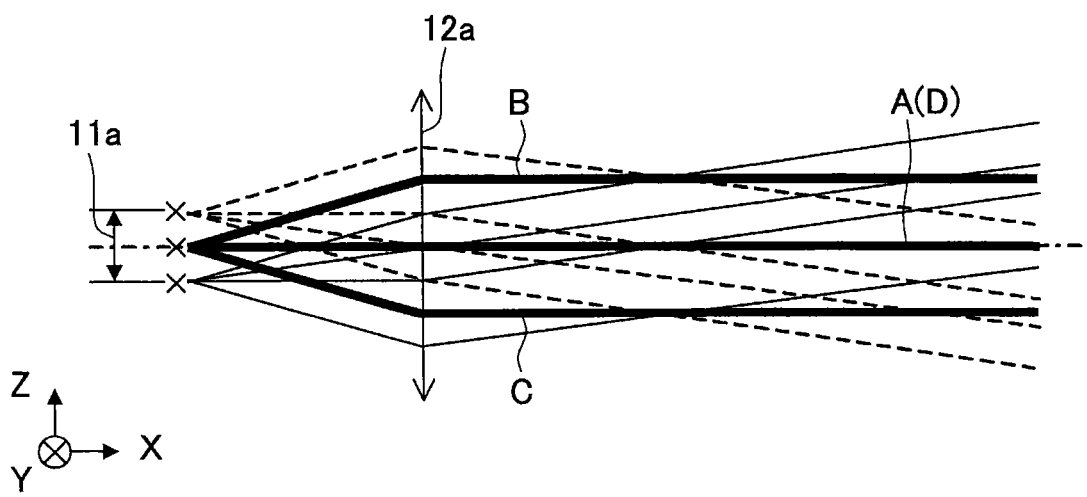
FIGS. 7A and 7B schematically illustrate example arrangements of the light source and the coupling lens.

FIGS. 7A through 8B schematically illustrate the arrangements of the light sources and the coupling lenses according to this embodiment. FIG. 7A illustrates a case where the light ray emission axis of the center of the emitting region of the light source 11 coincides with the optical axis of the coupling lens 12.

Figure 7B:
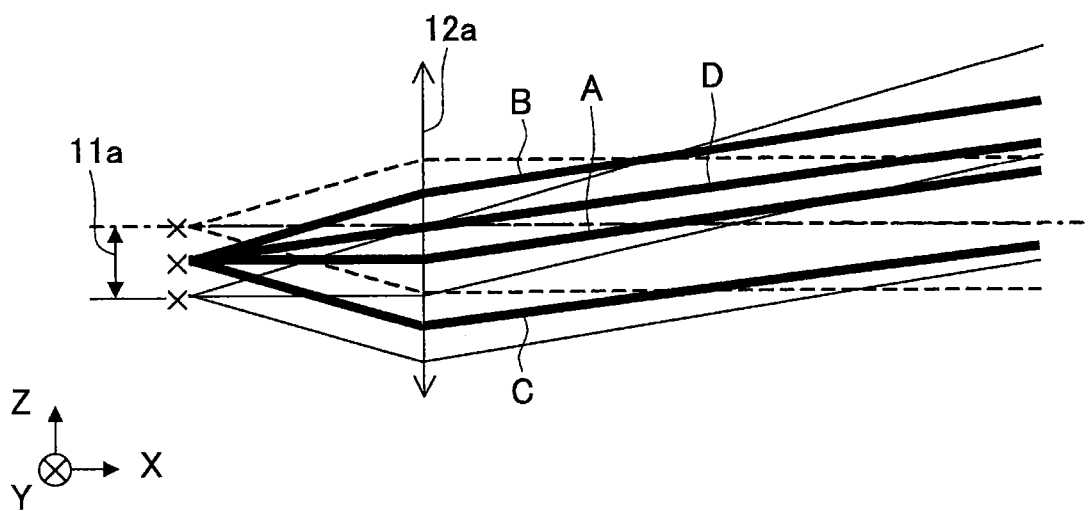

On the other hand, FIG. 7B illustrates a case where the light ray emission axis of the center of the emitting region of the light source 11 does not coincide with (differs from) the optical axis of the coupling lens 12. In FIGS. 7A and 7B, the reference numerals 11a and 12a denote the emitting region in the Z direction of the light source 11 which is a semiconductor laser and the principal (main) plane of the coupling lens 12, respectively.

In FIGS. 7A and 7B, the size of the emitting region 11a is considered, so that the light beams emitted from the center of the emitting region 11a are depicted as thick solid lines, the light beams emitted from the end of the emitting region 11a in the +Z direction are depicted as dotted lines, and the light beams emitted from the end of the emitting region 11a in the −Z direction are depicted as thin solid lines.

Further, the beam ray A has the peaked (maximum) emission intensity emitted in the direction parallel to the optical axis of the coupling lens 12. The beam rays B and C have half of the peaked (maximum) emission intensity. The beam ray D crosses the optical axis of the coupling lens 12 on the main surface of the coupling lens 12. Further, the signs A though D for the dotted lines and the thin solid lines of the light beams are omitted.

In FIG. 7A, the light beam depicted as the thick solid line extending from the center of the emitting region 11a coincides with the optical axis of the coupling lens 12. Therefore, in the light beam depicted as thick solid lines, the light ray A coincides with the light ray D.

Therefore, only three thick solid lines are illustrated. Further, herein, it is assumed that the light ray having the peaked (maximum) emission intensity emitted from the center of the emitting region 11a is considered as the geometric (gravity) center of the light beam emitted from the light source 11.

As illustrated in FIGS. 7A and 7B, when the light source 11 is thought of as an area light source and the emitting region 11a is considered, even if the light beam emitted from one point is changed into a parallel light beam by the coupling lens, the light beam may diffuse due to the influence of the radius of the emitting region 11a.

Figure 8A:
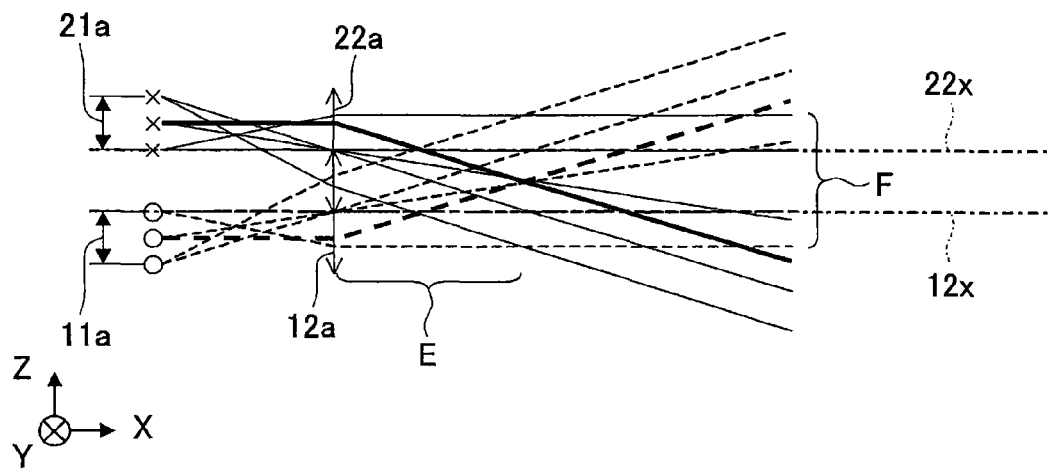
FIGS. 8A and 8B schematically illustrate additional example arrangements of the light source and the coupling lens.
Figure 8B:
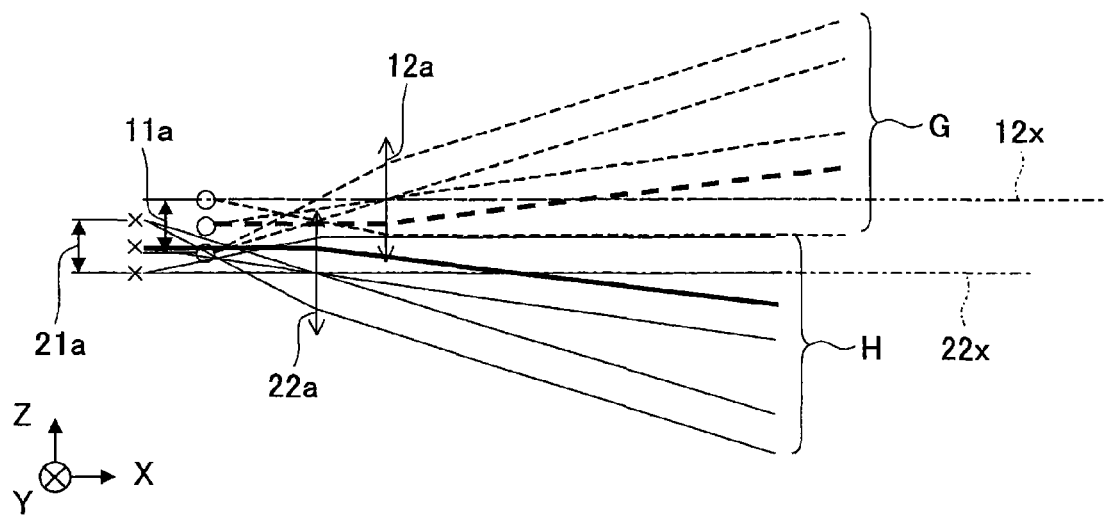

FIGS. 8A and 8B illustrate the combining of the light beams emitted from the light sources 11 and 21. For simplification purposes, the illustration of the combining by the combining unit is herein omitted. FIGS. 8A and 8B illustrate the light ray having the peaked (maximum) emission intensity of the light beam emitted from the center of the emission region (i.e., the light ray which becomes the geometric center of the light beam emitted from the light source), the light ray passing the optical axis of the coupling lens, the light rays of the light beams emitted from the ends in the +Z and −Z directions of the emitting region and passing the optical axis of the coupling lens, and the outermost light rays of the irradiated region.

Further, the light rays emitted from the light source 11 are depicted as the dotted lines, and the light rays emitted from the light source 21 are depicted as the solid lines. However, the light rays that become the respective geometric centers of the light beams are depicted as the thick solid lines. Further, the reference numerals 12x and 22x denote the optical axes of the coupling lenses 12 and 22, respectively.

FIG. 8A illustrates a method of preventing the increase of the size of the rotation mirror. In FIG. 8A, the light source 11 serves as the light source that relatively irradiates the +Z direction side. To that end, the position of the emitting region 11a of the light source 11 in the Z direction is relatively shifted in the −Z direction when compared with the position of the emitting region 21a of the light source 21.

By having the configuration as illustrated in FIG. 8A, the irradiated region of the light beams having passed through the main surfaces 12a and 22a of the coupling lenses 12 and 22, respectively, is not expanded until the end of the range E. Therefore, by disposing the rotation mirror 14 so that the light beams are incident on the rotation mirror 14 within the range E, it may become possible to prevent the increase of the size of the rotation mirror 14.

Further, in the configuration of FIG. 8A, the light ray irradiating the outermost position in the −Z direction of the light source 11 is designed to be parallel to the light ray irradiating the outermost position in the +Z direction of the light source 21. By doing this, the region F where the irradiated regions of the light sources 11 and 21 are overlapped may not expand and become constant.

If the region F expands where irradiated regions of the light sources 11 and 21 are overlapped or if it is required to increase the aperture (gap), the direction of the light ray of the light source 11 irradiating the outermost end in −Z direction and the direction of the light ray of the light source 21 irradiating the outermost end in +Z direction may be determined so that there is a predetermined angle generated between those directions.

FIG. 8B illustrates a method of reducing the region where the irradiated regions of the light sources 11 and 21 are overlapped. In FIG. 8B, for explanatory purposes, the emitting region 11a of the light source 11 is shifted in the +X direction relative to the emitting region 21a of the light source 21.

However, actually, the position of the emitting region 11a of the light source 11 is the same as the position of the emitting region 21a of the light source 21 in the X direction. However, as illustrated in FIG. 8B, the emitting region 11a of the light source 11 may be shifted in the +X direction relative to the emitting region 21a of the light source 21.

In FIG. 8B, it is assumed that the light source 11 irradiates the region on the relatively plus side in the Z direction. To that end, the position of the emitting region 11a of the light source 11 is shifted in the +Z direction when compared with the position of the emitting region 21a of the light source 21. Also, the light rays emitted from the light sources 11 and 21 to become the respective geometric centers of the light beams are designed so as not to cross each other.

By having the configuration as illustrated in FIG. 8B, it may become possible to prevent the light rays of the light source 11 irradiating the outermost end in the −Z direction from crossing the light rays of the light source 21 irradiating the outermost end in the +Z direction.

As a result, it may become effective when an object having a greater size in the Z direction is to be detected. Further, it may become possible to distinguish the irradiated region G of the light source 11 from the irradiated region H of the light source 21. As a result, the detection accuracy may be improved.

In this embodiment, as the angle of diffusion from one point, the directions of the light rays having the half of the peaked (maximum) emission intensity of the light source 11 are designed so as not to cross the light rays of the light source 21. However, the maximum emission intensity where the overlap is allowed may be arbitrarily changed by determining the distance between the light sources 11 and 21 in the Z direction.

When it is not desired that the irradiated region of the light source 11 overlaps the irradiated region of the light source 21, the positions of the light sources 11 and 21 may be changed in the Z direction so that the light amount of the overlapped area is less than or equal to a desired value.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

For example, in the above embodiments, a case is described where the number of the light sources is two. However, the object detection apparatus according to an embodiment may include three or more light sources.

What is claimed is:

1. An object detection apparatus comprising:
   an incident optical system including
      a plurality of light source units, and
      a combining unit to combine light beams emitted from the light source units;
   a deflection unit including rotating reflection parts that deflect the light beams to scan and be irradiated on a predetermined range of an object;
   an imaging unit to form an image based on reflected light or scattered light from the predetermined range of the object; and
   an optical detector to detect the object based on the reflected light or the scattered light received via the imaging unit,
   wherein the combining unit is to combine the light beams emitted from the light source units such that each of the combined light beams travels a single light path when the combined light beams are viewed along a first plane,
   wherein the light source units include respective light sources and optical devices that change a state of the light beams emitted from the light sources into a predetermined state,
   wherein when the light sources and the optical devices are viewed along a second plane which is perpendicular to the first plane, the light sources and the optical devices of the light source units are disposed in different positions, respectively, so that the light beams emitted from the light sources of the light source units are incident on the deflection unit at different angles when the light beams are viewed along the second plane, and
   wherein the first plane is perpendicular to a plane that includes the light beams which are to be incident on the deflection unit.

2. The object detection apparatus according to claim 1, wherein the light source units are disposed such that the light beams emitted from the light sources cross each other in a region in the second plane and rays, which are emitted from the light sources to become respective geometric centers of the light beams emitted from the light sources, do not cross each other in any region in the second plane.

3. The object detection apparatus according to claim 1, wherein when it is assumed that a three-dimensional coordinate system is defined by X, Y, and Z axes in which the X axis extends from the deflection unit to a center of the predetermined range of the object, the Y axis extends in the direction parallel to the scanning direction of the deflection unit, and the Z axis extends in the direction parallel to the rotating axis of the deflection unit, the first plane corresponds to the XY plane.

4. The object detection apparatus according to claim 1, further comprising:
   a light source driving unit to drive and control the light source units,
   wherein the optical detector includes an optical detector, which has a light receiving surface to receive the light beams transmitted via the imaging unit, and an optical detector driving unit that drives and controls the optical detector,
   wherein the light source units and the optical detector are disposed so that an emission direction of the light beams emitted from the light sources is perpendicular to the light receiving surface of the optical detector, and
   wherein the light source driving unit and the optical detector driving unit are integrally provided.

5. The object detection apparatus according to claim 1, further comprising:
   a light source driving unit to drive and control the light source units,
   wherein the deflection unit includes a deflector having a rotation axis and a deflector driving unit that drives and controls the deflector,
   wherein the light source driving unit and the deflector driving unit are disposed so that the emission direction of the light beams emitted from the light sources is parallel to the rotation axis, and
   wherein the light source driving unit and the deflector driving unit are integrally provided.

6. The object detection apparatus according to claim 1, wherein the combining unit is a polarization beam splitter.

7. The object detection apparatus according to claim 6, wherein the light source units include respective light sources having an active layer,
   wherein the active layers are disposed in the same direction,
   wherein the object detection apparatus further comprises a polarization direction changing unit disposed between one of the light sources and the combining unit, and to change the polarization direction of the light beams.

8. The object detection apparatus according to claim 6, further comprising:
   a polarization direction changing unit to change a state of the light beams combined by the combining unit.

* * * * *